United States Patent [19]

Swoboda et al.

[11] Patent Number: 5,236,775

[45] Date of Patent: Aug. 17, 1993

[54] FABRIC FOR AIRBAG

[75] Inventors: Peter Swoboda, Grosseaitingen; Gerhard Höhnke, Bobingen; Wolfgang Göltner, Bad Hersfeld, all of Fed. Rep. of Germany

[73] Assignee: Hoechst Aktiengesellschaft, Fed. Rep. of Germany

[21] Appl. No.: 989,113

[22] Filed: Dec. 11, 1992

Related U.S. Application Data

[63] Continuation of Ser. No. 654,323, Feb. 12, 1991, abandoned.

[30] Foreign Application Priority Data

Feb. 12, 1990 [DE] Fed. Rep. of Germany ....... 4004216

[51] Int. Cl.$^5$ .............................................. D03D 3/00
[52] U.S. Cl. .................. 428/225; 139/384 R; 139/387 R; 139/389; 139/426 TW; 280/728; 428/224; 428/257; 428/258; 428/219; 428/220
[58] Field of Search ............... 428/225, 229, 257, 258, 428/219, 220; 280/728; 139/384 R, 387 R, 389, 426 TW

[56] References Cited

U.S. PATENT DOCUMENTS

| | | | |
|---|---|---|---|
| 4,921,735 | 5/1990 | Bloch | 428/229 |
| 4,977,016 | 12/1990 | Thornton et al. | 428/225 |
| 5,010,663 | 4/1991 | Thornton et al. | 428/225 |
| 5,073,418 | 12/1991 | Thornton et al. | 428/229 |
| 5,093,163 | 3/1992 | Krummheuer et al. | 428/225 |

Primary Examiner—James J. Bell
Attorney, Agent, or Firm—Connolly & Hutz

[57] ABSTRACT

There is described an airbag fabric made of a synthetic yarn. The synthetic yarn is a high-tenacity polyester filament yarn having filaments of less than 4 dtex and a yarn count within the range from 250 to 550 dtex. The fabric itself, in contrast to the conventional polyamide fabrics, is uncoated and is preferably made by weaving unsized yarns. The fabric need not be calendered. It has been found that this fabric of fine-filament high-tenacity polyester yarn, although uncoated, does meet the airbag fabric requirements such as low air permeability, low fabric weight, low fabric thickness and high fabric strength.

18 Claims, No Drawings

FABRIC FOR AIRBAG

CROSS-REFERENCE TO RELATED APPLICATION

The present invention is a continuation of application Ser. No. 654,323, filed Feb. 12, 1991 now abandoned.

The invention relates to a synthetic fabric for an airbag as increasingly used as a safety device in automotive vehicles.

An airbag has the function, in the event of danger, of being unfolded by very rapidly incoming gas into a balloon which, owing to the high pressure prevailing therein, is capable of absorbing the impact of a body effectively yet softly. This presupposes that the high pressure prevailing in the airbag is retained until the vehicle and hence the body to be cushioned has come to a stop. The, however, the protective balloon should collapse as rapidly as possible so as not to hinder further actions on the part of the protected person. An airbag therefore has very precise requirements in terms of the increase and decrease in pressure with time, which are achievable by fitting preset outlet valves in an otherwise gas-impermeable sleeve of the airbag or by making part of its sleeve, the jacket, gastight while the side parts exhibit a certain level of gas permeability. Important requirements for the fabric of such an airbag are low air permeability for the fabric of such an airbag are low air permeability, a low fabric weight and a low fabric thickness (to save space in the automotive vehicle) and high fabric breaking strength and breaking extension (to absorb the energy in the explosive unfolding of the airbag).

The airbags used in the field are made predominantly of a rubberized polyamide fabric, the rubberization ensuring the low level of air permeability. Such a coated fabric is described for example in DE-A-23 17 991. EP 314 867 discloses an uncoated polyamide fabric for an airbag, where the low air permeability is said to be achieved by shrinking, heat setting and calendering the fabric. It is mentioned in this publication that instead of polyamide yarns it is also possible to use yarns made of polyester, aramids, PPS, polyimides and the like. The fabric described therein has a plain weave with 34 warp threads/cm in dtex 470 and 16 weft threads/cm in dtex 470.

Japanese Patent Application Sho-64-441438 (Derwent Abstract JA 89-090413/12) discloses a base fabric for an airbag, which consists of a yarn having a breaking strength of more than 8.5 g/den and an individual fiber denier of less than 3 and which has a sheet weight of 50 to 300 g/m$^2$. The yarn used should have a count of between 150 and 3000 den and be a multifilament yarn or a spun yarn, and it may also have been bulked. Suitable materials for making the filaments or fibers are said to be virtually all spinable synthetic or cellulosic polymers, such as polyamides, polyesters, vinyl polymers, polyolefins, rayon, polyoxymethylene, polysulfones. However, carbon fibers, glass fibers, ceramic fibers and metal fibers are also said to be suitable. To manufacture an airbag from this known base fabric the latter must be rubberized as usual. This publication does not provide the person skilled in the art with any information for obtaining a fabric which is suitable for manufacturing an airbag without rubberization.

Rubberizing the polyamide fabric makes the manufacture of the airbag complicated and costly, and increases the space required by the folded airbag. Also, because of the rubberization, these polyamide fabrics tend to become brittle, which shortens the life of the airbag. The prior art alternative to rubberization of shrinking, heat setting and calendering the fabric likewise makes the manufacture of the airbag complicated and costly.

It is an object of the present invention to provide a coating-free synthetic yarn airbag fabric which is particularly simple to manufacture and yet meets the airbag material requirements, such as low air permeability, low fabric weight, low fabric thickness and high fabric strength.

This object is achieved by the invention defined in claim 1.

As has been found, surprisingly, the use of a high tenacity polyester filament yarn having fine filaments of 4 dtex or less and a yarn count within the range of 250 to 550 dtex makes possible without special fabric aftertreatment such as shrinking, heat setting or calendering to produce an airbag fabric which even without coating and rubberization has the required properties, in particular a low air permeability. The fabric formed according to the present invention is thus notable for its particularly simple manufacture. Owing to the absence of rubberization, there is no danger of embrittlement, and this has a correspondingly favorable effect on airbag life.

The filaments of the polyester yarn may be for example 3.3 dtex, preferably even less than 3 dtex. The count of the polyester yarn is preferably within the rang from 280 to 450 dtex, in particular within the range from 280 to 350 dtex.

The low air permeability of the fabric formed according to the present invention is likely to be due in particular to the fine filaments of the warp and weft polyester yarns. The fine yarn count leads to a low fabric weight and a low fabric thickness. The sheet weight of the fabric is preferably less than 200 g/m$^2$, in particular less than 190 g/m$^2$, for example 177 g/m$^2$, while the fabric thickness is preferably less than 0.35 mm, particularly preferably less than 0.30 mm, in particular less than 0.26 mm.

Preferably, the polyester yarn has a tenacity of more than 60 cN/tex and a breaking extension of more than 15%.

A particularly good choice for manufacturing the fabric of the present invention is for example a commercial polyester yarn (R) TREVIRA HOCHFEST from Hoechst AG. The breaking strength of the fabric should be more than 220 daN and the breaking extension of the fabric should be more than 25%, each requirement being based on a 5 cm wide fabric strip. These strength and extension values ensure that the fabric is suitable for absorbing the energy of the explosive expansion of the airbag.

For the purpose of the present invention it is possible to use fabrics of a wide range of weaves, for example a 1/1 plain weave. To modify the fabrics in a specific manner, however, variants, for example a rip stop weave or a cross-twill weave, may be preferable.

To minimize the air permeability, as is desirable in particular for the jacket region of the airbag, the fabric should be woven to the tightest setting possible for the chosen yarn count and the chosen fabric construction; that is, the fabric should be woven with the maximum number of threads per unit length warpways and weftways.

A 1/1 plain fabric, for example in a 313-dtex polyester yarn, is advantageously woven with from 23 to 29 threads/cm—for example 26 threads/cm—in warp and weft.

If the yarn count is lower, the number of threads/cm will be larger, if the yarn count is higher, the number of threads/cm will be lower. In rip stop fabrics for example the corresponding number of threads is from 25 to 30/cm. In a particularly preferred embodiment of the invention, the fabric of the airbag jacket has a rip stop weave and a very tight set. Furthermore, it is preferable here for there to be a multiple yarn every 3 to 8 mm. Of particular advantage is a spacing of about 4.5 to 5.5 mm between the multiple yarns and the choice of a double yarn as multiple yarn.

If the airbag, in addition to its gastight fabric part, has a gas-releasing fabric part, then the gas-releasing part preferably comprises a fabric whose set is from 10 to 25% less than that of the gastight fabric part, ie. a set which in the case of a 1/1 plain weave and a 313 dtex yarn is about $18 \geq 26$ threads/cm, for example 22 threads/cm in the warp and 24 threads/cm in the weft. As with the jacket area, if the yarn count i slower the set is made correspondingly higher and if the yarn count is higher the set is made correspondingly lower. Particularly preferably the gas-releasing fabric is constructed in a cross-twill weave, in particular in a warp cross-twill weave.

This lower fabric set gives the intended higher air permeability required of the gas-releasing fabric part. Otherwise, the gas-releasing fabric part can have virtually the same yarn and weave properties as the gastight fabric part.

In a further refinement of the invention, the fabric of the gastight part (jacket part) is made of twisted warp yarns and untwisted weft yarns, while the weft yarn of the fabric of gas-releasing part is untwisted, although it may also be twisted. The yarn twist is preferably within the range from 110 to 130 turns/m, in particular about 120 turns/m.

It advantageous to use an unsized polyester yarn having heat shrinkage at 200° C. of less than 9%, preferably less than 6%, in particular less than 4.7%.

As mentioned, the fabric constructed according to the present invention requires no shrinking or heat setting. Nor, in the light of the low fabric thickness, is calendering necessary. These measures therefore are preferably omitted.

The present invention also provides an airbag, in particular an airbag with a gastight and a gas-releasing fabric part which is made essentially of the above-described uncoated and unrubberized and preferably also unsized and uncalendered woven fabrics.

In a preferred embodiment of the airbag of the present invention, the gastight fabric part is a fabric woven to a set of maximum tightness, in particular in a rip stop weave, preferably with a multiple yarn every 3–8 mm. It is particularly advantageous to have a spacing of about 4.5 mm to 5.5 mm between the multiple yarns and to choose a double yarn as multiple yarn.

In a further preferred embodiment, the gas-releasing fabric part is made of a woven fabric with a set 10 to 25% less than that of the gastight fabric part and which preferably has a cross-twill weave, in particular a warp cross-twill weave.

Preference is further given to those airbags of the present invention in which the gastight fabric is made of twisted warp yarns and untwisted weft yarns while the gas-releasing fabric by contrast is made of twisted warp and weft yarns.

Particularly preferred embodiments of the fabric and airbag of the present invention are those which combine a plurality of the abovementioned preferred features.

The fabric of the present invention is manufactured in a conventional weaving process, and the process of manufacture comprises weaving a high-tenacity polyester filament yarn having a filament dtex of 4 or less and a yarn count within the range from 250 to 550 dtex.

Preferably, the polyester yarn has a tenacity of more than 60 cN/tex and a breaking extension of more than 15%. It is further advantageous to use a polyester yarn which has a heat shrinkage at 200° C. of less than 9%, preferably less than 6%, in particular less than 4.7%. More particularly, to manufacture a fabric for the gastight part of an airbag which combines a gastight with gas-releasing fabric part, a twisted warp yarn and an untwisted weft yarn are used. To manufacture a fabric for the gas-releasing part it is preferable to use a twisted warp yarn and a twisted or an untwisted weft yarn. It has further been found to be advantageous to use a 1/1 plain weave but preferably a rip stop weave for the gastight material and a cross-twill weave, in particular a warp cross-twill weave, for the gas-releasing material.

Further advantages are obtained on weaving with a machine setting such that the other preferred fabric parameters mentioned above are obtained.

The manufacture of an airbag of the present invention which combines a gastight and a gas-releasing fabric part is effected by joining together suitably trimmed fabric webs in a conventional manner and comprises using for the gastight part a fabric as claimed in claim 1 of a maximum set and for the gas-releasing part a fabric as claimed in claim 1 whose set is 10–25% less than that of the gastight part.

Preferably, the gastight part is made of a fabric of twisted warp yarns and untwisted weft yarns and the gas-releasing part of a fabric of twisted warp and weft yarns.

The manufacture of further, particularly preferred embodiments of the airbag of the present invention may be effected by using the above-described fabrics in a combination of preferred properties, for example by using a gastight jacket fabric in a rip stop weave and a gas-releasing fabric in a cross-twill weave.

EXAMPLE 1

An uncoated fabric for an airbag was manufactured using a 315-dtex 96-filament TREVIRA HOCHFEST high-tenacity polyester yarn, each filament thus being 3.3 dtex.

This yarn had the following properties:
Breaking strength 20.8N
Tenacity 66 cN/tex
Breaking extension 19%
Shrinkage at 200° C. 4.7%
Melting point 257° C.

A) The fabric construction chosen was a 1/1 plain weave, in which unsized 315-dtex 96-filament TREVIRA HOCHFEST with 120 turns per meter in the Z direction was used in the warp and untwisted 315-dtex 96-filament TREVIRA HOCHFEST in the weft. The maximum set was chosen, which was 26 threads/cm for both the warp and the weft. The gray-state fabric had the following data:

| Sheet weight | 177 g/m² |
| --- | --- |
| Fabric thickness | 0.26 mm |
| Breaking strength | 255 daN (warp) |
| (measured on a 5 cm wide strip) | 265 daN (weft) |
| Breaking extension | 34% (warp) |
| (measured on a 5 cm wide strip) | 26% (weft) |
| Air permeability | 6 l m⁻² sec⁻¹ under a hydro-static head of 50 mm |

This fabric, woven from unsized polyester yarns, was produced without finishing or calendering, nor provided with any coating, and was used in the gastight part of an airbag.

B) The gas-releasing part of the airbag was made of a fabric of the following construction:

| Warp: | unsized 315-dtex 96-filament TREVIRA HOCHFEST 120 turns per meter in the Z direction |
| --- | --- |
| Weft: | 315 dtex-96-filament TREVIRA HOCHFEST 120 turns per meter in the Z direction |
| Fabric set: | 22 threads/cm (warp) 24 threads/cm (weft) 1/1 plain weave |

The gray-state fabric for the gas releasing airbag part has the following data:

| Sheet weight | 156 g/m² |
| --- | --- |
| Fabric thickness | 0.23 mm |
| Breaking strength | 226 daN (warp) |
| (measured on a 5 cm wide strip) | 226 daN (weft) |
| Breaking extension | 25.5% (warp) |
| (measured on a 5 cm wide strip) | 27% (weft) |
| Air permeability | 78 l m⁻² sec⁻¹ under a hydro-static head of 50 mm |

As can be seen, the fabric for the gas-releasing part of the airbag was made not only of twisted warp yarns but also of twisted weft yarns and with a reduced set compared with the fabric for the gastight part of the airbag, namely reduced from 26 threads/cm to 22 to 24 threads/cm respectively. This resulted in an increase in the air permeability of 6 to 78 $lm^{-2} sec^{-1}$ under a hydrostatic head of 50 mm.

EXAMPLE 2

A) An uncoated fabric for the gastight part of an airbag was produced using a 315-dtex 100-filament TREVIRA HOCHFEST polyester filament yarn, the filaments thus being 3.15 dtex. This yarn had the following properties:

| Breaking strength | 20.8 N |
| --- | --- |
| Tenacity | 66 cN/tex |
| Breaking extension | 19% |
| Shrinkage at 200° C. | 4.7% |
| Melting point | 257° C. |

The fabric construction was a rip stop (5 mm), with a set of 28/28 threads/cm with 315-dtex 100-filament TREVIRA HOCHFEST with 120 turns per meter Z in the warp and untwisted 315-dtex 100-filament TREVIRA HOCHFEST in the weft.

"Rip stop (5 mm)" here denotes a rip stop weave with a double yarn in warp and weft approximately every 5 mm. The gray-state fabric had the following data:

| Sheet weight | 194 g/m² |
| --- | --- |
| Fabric thickness | 0.33 mm |
| Breaking strength | 239 daN (warp) |
| (measured on a 5 cm wide strip) | 277 daN (weft) |
| Breaking extension | 31% (warp) |
| (measured on a 5 cm wide strip) | 28% (weft) |
| Air permeability | 4.7 l m⁻² sec⁻¹ under a hydro-static head of 50 mm |

This fabric, woven from unsized polyester yarns, was produced without finishing or calendering, nor provided with any coating, and was used in the gastight part of an airbag.

B) The gas-releasing part of the airbag was made of a fabric of the following construction:

| Warp: | 315 dtex 100-filament TREVIRA HOCHFEST 120 turns per meter Z unsized |
| --- | --- |
| Weft: | 315 dtex 100-filament TREVIRA HOCHFEST 120 turns per meter Z |
| Fabric set: | warp cross-twill 2/2 with 24 threads/cm (warp) and 24 threads/cm (weft) |

The data of the gray-state fabric for the gas-releasing part of the air bag were as follow:

| Sheet weight | 159 g/m² |
| --- | --- |
| Fabric thickness | 0.25 mm |
| Breaking strength | 240 daN (warp) |
| (measured on a 5 cm wide strip) | 229 daN (weft) |
| Breaking extension | 25% (warp) |
| (measured on a 5 cm wide strip) | 23% (weft) |
| Air permeability | 48 l m⁻² sec⁻¹ under a hydro-static head of 50 mm |

EXAMPLE 3

A) Proceeding in a manner similar to that described under A) in the preceding examples it is also possible to obtain a jacket fabric for an airbag by using a polyester yarn of the above specification which has a count designation of 400-dtex 100-filament. On using the settings evident from the following listing it is possible to obtain the stated fabric data.

| Yarn count designation | 400-dtex 100-filament |
| --- | --- |
| Construction | Rip stop (5 mm) |
| Thread density (warp/weft) | 24/24 |
| Sheet weight | 210 g/m² |
| Fabric thickness | 0.36 mm |
| Breaking strength (5 cm) (warp/weft) | 255/303 daN |
| Breaking extension (5 cm) (warp/weft) | 35/29 |
| Air permeability l m⁻² sec⁻¹ under a hydro-static head of 50 mm | 9.4 |

B) Proceeding in a manner similar to that described under B) in the preceding examples it is also possible to obtain a gas-permeable fabric for an airbag by using a 400-dtex 100-filament TREVIRA HOCHFEST with 120 turns/m in the Z direction in the warp and untwisted 400-dtex 100-filament TREVIRA HOCHFEST in the weft. Selecting the settings evident from the following listing it is possible to obtain the state fabric data:

| Construction | 2/2 warp cross-twill |
|---|---|
| Thread density (warp/weft) | 20/20 cm$^{-1}$ |
| Sheet weight | 163 g/m$^2$ |
| Fabric thickness | 0.35 mm |
| Breaking strength (warp/weft) | 250/236 daN |
| Breaking extension (5 cm) (warp/weft) | 26/21 |
| Air permeability 1 m$^{-2}$ sec$^{-1}$ under a hydrostatic head of 50 mm | 90 |

We claim:

1. An uncoated synthetic yarn fabric for a gastight part of an airbag having a gastight part and a gas-releasing part, wherein the synthetic yarn is a high-tenacity polyester filament yarn with filaments of 4 dtex or less and the yarn count is within the range from 250 to 550 dtex, and the fabric is constructed with a rib stop weave.

2. The fabric of claim 1, wherein the polyester yarn has a tenacity of more than 60 cN/tex and a breaking extension of more than 15%.

3. The fabric of claim 1, wherein the polyester yarn has a heat shrinkage at 200° C. of less than 9%.

4. The fabric of claim 1, wherein the polyester yarn is unsized.

5. A fabric according to claim 1 for the gastight part of an airbag made of a gastight and a gas-releasing fabric part, comprising twisted warp yarns and untwisted weft yarns.

6. A fabric according to claim 1 for the gas-releasing part of an airbag made of a gastight and a gas-releasing fabric part, comprising twisted warp yarns and twisted or untwisted weft yarns.

7. The fabric of claim 5, wherein the yarn twist is within the range 110–130 turns/m.

8. The fabric according to claim 1, having a sheet weight of less than 200 g/m$^2$ and a thickness of less than 0.35 mm.

9. The fabric according to claim 1, having a breaking strength of more than 220 daN and a breaking extension of more 25%, each measured on a 5 cm wide strip.

10. The fabric according to claim 1 for the gastight part of an airbag possessing the maximum set for the chosen yarn count and the chosen fabric construction.

11. An uncoated synthetic yarn fabric for a gas-releasing part of an airbag having a gastight part and a gas-releasing part, wherein the synthetic yarn is a high-tenacity polyester filament yarn with filaments of 4 dtex or less and the yarn count is within the range from 250 to 550 dtex, and the fabric is constructed with a cross twill weave.

12. The fabric of claim 11, wherein the polyester yarn has a tenacity of more than 60 cN/tex and a breaking extension of more than 15%.

13. The fabric of claim 11, wherein the polyester yarn has a heat shrinkage of 200° C. of less than 9%.

14. The fabric of claim 11, wherein the polyester yarn is unsized.

15. A fabric according to claim 11 for the gas-releasing part of an airbag made of a gastight and a gas-releasing fabric part, comprising twisted warp yarns and twisted or untwisted weft yarns.

16. The fabric of claim 15, wherein the yarn twist is within the range 110–130 turns/m.

17. The fabric according to claim 11, having a breaking strength of more than 220 daN and a breaking extension of more 25%, each measured on a 5 cm wide strip.

18. The fabric according to claim 11 for the gas-releasing part of an airbag possessing a 10–25% lower than the maximum set for the chosen yarn count and the chosen fabric construction.

* * * * *

UNITED STATES PATENT AND TRADEMARK OFFICE
CERTIFICATE OF CORRECTION

PATENT NO. : 5,236,775
DATED : August 17, 1993
INVENTOR(S) : Peter Swoboda, et. al.

It is certified that error appears in the above-indentified patent and that said Letters Patent is hereby corrected as shown below:

Column 1, line 18, "The" should read -- Then --.

Column 1, lines 28 and 29, "for the fabric of such an airbag are low air permeability" is redundant and should be deleted.

Column 1, line 47, "64-441438" should read -- 64-41438 --.

Column 3, line 21, "$18 \geqq 26$" should read -- 18 - 26 --.

Column 3, line 23, "i slower" should read -- is lower --.

Signed and Sealed this

Fifteenth Day of March, 1994

Attest:

BRUCE LEHMAN

*Attesting Officer*  *Commissioner of Patents and Trademarks*